(12) United States Patent
Allen (10) Patent No.: US 8,350,895 B2
(45) Date of Patent: Jan. 8, 2013

(54) STEREO PAIR AND METHOD OF MAKING STEREO PAIRS

(76) Inventor: Dann M Allen, Hartford City, IN (US)

( * ) Notice: Subject to any disclaimer, the term of this patent is extended or adjusted under 35 U.S.C. 154(b) by 670 days.

(21) Appl. No.: 12/624,800

(22) Filed: Nov. 24, 2009

(65) Prior Publication Data

US 2010/0066815 A1      Mar. 18, 2010

Related U.S. Application Data

(63) Continuation-in-part of application No. 08/923,694, filed on Sep. 4, 1997, now Pat. No. 5,963,303.

(51) Int. Cl.
*G03B 21/32* (2006.01)
(52) U.S. Cl. ............................................... 348/50
(58) Field of Classification Search .............. 348/50–69, 348/E13.074
See application file for complete search history.

(56) References Cited

U.S. PATENT DOCUMENTS

| | | | | |
|---|---|---|---|---|
| 2,002,090 | A * | 5/1935 | Ives ................................ | 352/43 |
| 3,815,979 | A | 6/1974 | Collender | |
| 4,157,487 | A * | 6/1979 | Riechmann ................... | 315/393 |
| 4,158,487 | A | 6/1979 | Collender | |
| 4,176,923 | A | 12/1979 | Collender | |
| 4,231,642 | A | 11/1980 | Collender | |
| 4,547,050 | A | 10/1985 | Collender | |
| 5,282,029 | A * | 1/1994 | Lawrence et al. ............... | 348/44 |
| 5,365,294 | A * | 11/1994 | Anderson ...................... | 396/336 |
| 5,420,626 | A * | 5/1995 | Lawrence et al. ............... | 348/44 |
| 5,543,964 | A * | 8/1996 | Taylor et al. .................. | 359/463 |
| 5,600,388 | A * | 2/1997 | Anderson ...................... | 396/324 |
| 5,717,415 | A * | 2/1998 | Iue et al. ........................... | 345/8 |
| 6,282,461 | B1 * | 8/2001 | Gan et al. ...................... | 700/258 |

\* cited by examiner

*Primary Examiner* — Tung Vo
(74) *Attorney, Agent, or Firm* — Ritchison Law Offices; John D Ritchison (57) ABSTRACT

An improved method of making stereoscopic pictures comprising photographing a scene with a camera spaced from the scene, moving the camera generally parallel to the scene while producing a plurality of pictures of the scene each taken at a different position relative to the scene, and separating the pictures into stereo pairs for viewing. Photographing and moving steps can be performed and the separating step can be done as soon as the pictures are available for viewing to produce the stereo pairs. Alternatively, the photographing and moving steps can be done at one time and the separating step can be done at subsequent times to produce the stereo pairs of the invention thereby allowing stereo pairs to be produced from existing motion pictures, computer generated images, videotapes and still photographs. The method can be used utilizing drones, satellites, rockets, slings and other vehicles to move the camera(s).

12 Claims, 9 Drawing Sheets

| 1-L | 4-R |
|-----|-----|
| 2-L | 5-R |
| 3-L | 6-R |
| 4-L | 7-R |
| 5-L | 8-R |
| 6-L | 9-R |
| 7-L | 10-R |
| 8-L | 11-R |
| 9-L | 12-R |
| 10-L | 13-R |

STEREO PAIR AND METHOD OF MAKING STEREO PAIRS

CROSS-REFERENCE TO RELATED APPLICATIONS

This application is a Continuation-in-Part filed under 37 CFR 1.53(b) and claims the benefit of the non-provisional (Regular Utility) U.S. Pat. No. 5,963,303 Issued Oct. 5, 1999 and filed as an application Ser. No. filed Sep. 4, 1997 by Dann Allen, and entitled "Stereo pair and method of making stereo pairs". U.S. Pat. No. 5,963,303 is not abandoned nor requested to be abandoned.

FIELD OF INVENTION

This invention and Continuation-in-Part application herein relates to a "Stereo pair and method of making stereo pairs" that is an improved method of making stereoscopic pictures comprising photographing a scene with a camera spaced from the scene, moving the camera generally parallel to the scene while producing a plurality of pictures of the scene each taken at a different position relative to the scene, and separating the pictures into stereo pairs for viewing. In performing the method, the photographing and moving steps can be performed and the separating step can be done as soon as the pictures are available for viewing to produce the stereo pairs.

Alternatively, the photographing and moving steps can be done at one time and the separating step can be done at subsequent times to produce the stereo pairs of the invention thereby allowing stereo pairs to be produced from existing motion pictures, videotapes, computer generated images, and still photographs. The method can be used utilizing conventional photographic and viewing equipment in all existing mediums. A film chip and a stereo pair made in accordance with the method of the invention are also included within the broader aspects of the invention.

FEDERALLY SPONSORED RESEARCH

None.

SEQUENCE LISTING OR PROGRAM

None.

BACKGROUND—FIELD OF INVENTION

This invention relates to stereo copy and stereo photography, and more particularly, to a method of making stereo pairs and an improved stereo pair.

Systems for taking and/or reproducing images with depth have been proposed before. They can be divided into two major groups, namely, those which form images due to the interference of beams of coherent light, such as lasers, which are called the holographic systems, and those which do not record by light beam interference, which are known as the non-holographic systems. Among the non-holographic systems are the stereoscopic systems and the 3-dimensional systems. These are distinguished in that stereoscopic systems are those in which a separate image is produced for each eye and viewing must be accomplished through some system utilizing segregation of the images for the left eye from those for the right eye. These include polarized viewers, polarized filters, shuttering, and physical separation. Other non-holographic systems have been produced wherein images with depth can be viewed without inconveniencing the viewer with image segregation devices. These are known as 3-dimensional systems.

The holographic systems have disadvantages inasmuch as both the objects which are to be photographed as well as the images which are to be reproduced need to be illuminated with coherent light. This hindered the commercialization of such systems as much systems are not capable of making photographs of distant objects which, like the moon, cannot be lit up with coherent light. It has been found impossible to photograph sunsets or reflections of the sun or moon or seascapes, or landscapes, etc. by these methods. Finally, as observation through a transparency is necessary, the size of the reproduced image is limited.

The non-holographic systems are disadvantaged because of the need of complex photographing systems and projection systems utilizing multiple cameras and projectors of specialized design. The stereoscopic systems all inconvenience the viewer or observer by placing optical filters or shuttering mechanisms in front of him. The 3-dimensional systems, while not inconveniencing the observer with such mechanisms, utilize ordinary light, but both the photographing set-up and the projection set-up are highly complex and expensive to use. See, for example, the patents issued to Collender, U.S. Pat. Nos. 4,176,923; 3,815,979; 4,547,050; 4,231,642; 4,158,487.

It is therefore highly desirable to provide an improved method for producing stereoscopic images.

It is also highly desirable to provide an improved method for producing stereoscopic images which can be produced utilizing conventional cameras, relatively simple and inexpensive equipment, and ordinary lighting.

It is also highly desirable to provide an improved method for making pictures in which relatively inexpensive and conventional still cameras, motion picture cameras, computer generated images or video cameras can be utilized to produce stereoscopic still or motion pictures using ordinary light and conventional film, videotape, computer generated images or other medium.

It is also well known that film libraries include many motion pictures and still pictures which have been photographed utilizing conventional 2-dimensional photography. Many of these films are classics and cannot be reproduced, although their viewing pleasure would be enhanced if such could be re-filmed in a manner to create the third dimension of depth. Thus, it is also highly desirable to provide an improved method by which stereoscopic duplicates can be produced. It is also highly desirable to provide a method for producing stereoscopic pictures from still or moving pictures recorded on a variety of mediums utilizing conventional photographic equipment and ordinary light. It is also highly desirable to provide such a method which utilizes a single conventional still camera, motion picture camera, computer generated images or video camera.

Finally, photographers in making pictures utilize their artistic talents to create special effects and aesthetically pleasing scenes. It is therefore highly desirable to provide a new and improved method for producing stereoscopic pictures which do not limit the artistic desires of the photographer.

It is also highly desirable to provide an improved method for making stereoscopic pictures which will allow for utilizing special effects such as blurring to convey the motion of speed, and hyper-stereo and hypo-stereo effects as desired.

Finally, it is highly desirable to provide an improved method for producing stereo pictures which have all of the above features.

SUMMARY OF THE INVENTION

It is therefore an object of the invention to provide an improved method for producing stereoscopic images.

It is also an object of the invention to provide an improved method for producing stereoscopic images which can be produced utilizing conventional cameras, relatively simple and inexpensive equipment, and ordinary lighting.

It is also an object of the invention to provide an improved method for making pictures in which relatively inexpensive and conventional still cameras, computer generated images, picture cameras or video cameras can be utilized to produce stereoscopic still or motion pictures using ordinary light and conventional film, videotape or other medium.

It is also an object of the invention to provide an improved method by which stereoscopic duplicates can be produced.

It is also an object of the invention to provide a method for producing stereoscopic pictures from still or moving pictures recorded on a variety of mediums utilizing conventional photographic equipment and ordinary light.

It is also an object of the invention to provide such a method which utilizes a single conventional still camera, motion picture camera, computer generated images or video camera.

It is also an object of the invention to provide a new and improved method for producing stereoscopic pictures which does not limit the artistic desires of the photographer.

It is also an object of the invention to provide an improved method for making stereoscopic pictures which will allow for utilizing special effects such as blurring to convey the motion of speed, and hyper-stereo and hypo-stereo effects as desired.

Finally, it is an object of the invention to provide an improved method for producing stereo pictures which have all of the above features.

In the broader aspect of the invention, there is provided an improved method of making stereoscopic pictures comprising photographing a scene with a camera spaced from the scene, moving the camera generally parallel to the scene while producing a plurality of pictures of the scene each taken at a different position relative to the scene, and separating the pictures into stereo pairs for viewing. In performing the method, the photographing and moving steps can be performed and the separating step can be done as soon as the pictures are available for viewing to produce the stereo pairs.

Alternatively, the photographing and moving steps can be done at one time and the separating step can be done at subsequent times to produce the stereo pairs of the invention thereby allowing stereo pairs to be produced from existing motion pictures, computer generated images, videotapes and still photographs. The method can be used utilizing conventional photographic and viewing equipment in all existing mediums. A film chip and a stereo pair made in accordance with the method of the invention are also included within the broader aspects of the invention.

DESCRIPTION OF THE DRAWINGS—FIGURES

The accompanying drawings, which are incorporated in and constitute a part of this specification, illustrate an embodiment of the "Stereo pair and method of making stereo pairs. The drawings together with the summary description given description given below serve to explain the principles of the "Stereo pair and method of making stereo pairs. It is understood, however, that the "Stereo pair and method of making stereo pairs" is not limited to only the precise arrangements and instrumentalities shown.

The above-mentioned and other features and objects of the invention and the manner of attaining them will become more apparent and the invention itself will be better understood by reference to the following description of an embodiment of the invention taken in conjunction with the accompanying drawings wherein:

FIGS. 11A through 11 C are sketches of two drones in various positions with respect to each other.

FIGS. 12A through 12 C are additional sketches of two drones in various positions with respect to each other.

DESCRIPTION OF THE DRAWINGS—REFERENCE NUMERALS

The following list refers to the drawings:

| Item | Description |
|------|-------------|
| 12 | Scene |
| 14 | Camera |
| 16 | Longitudinal axis |
| 18 | Motion arrow or camera path |
| 20 | Dolly |
| 22 | Track |
| 30 | Camera |
| 32 | Stationary table |
| 34 | Screen |
| 36 | Sequencer |
| 38 | Rolls |
| 40 | Rolls |
| 42 | Direction arrow |
| 44 | Scene or tape |
| 50 | Filmstrip |
| 80 | Drone or equal with camera or equal |
| 80A | Drone on first pass |
| 80B | Drone on second pass |
| 81A | First drone |

-continued

| Item | Description |
|------|-------------|
| 81B | Second drone |
| 90 | Long range photograph of Mars |
| 91 | Closer range photograph during a pass showing more detail |
| 95 | Space exploration vehicle like a Rover or equal |
| D | distance |

DETAILED DESCRIPTION OF PREFERRED EMBODIMENT

Figure 1:
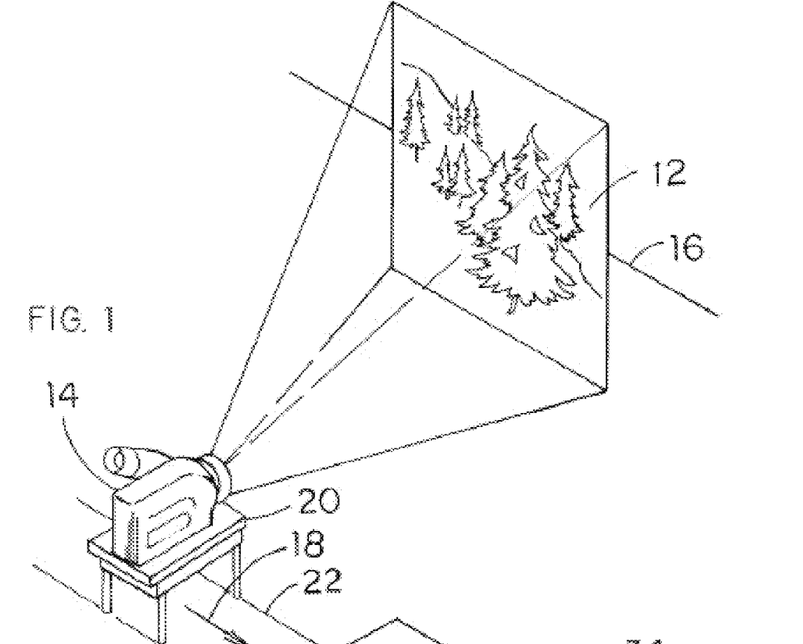
FIG. 1 is a diagrammatic set-up of the apparatus used in photographing a scene to produce stereographic pictures in accordance with the improved method of the invention.

Referring to FIG. 1, the improved method of the invention comprises the steps of photographing a scene 12 with a camera 14, moving the camera 14 relative to the scene 12 while photographing the scene 12. The scene 12 is 3-dimensional and has a longitudinal axis 16. The motion of the camera relative to the scene 12 as depicted by arrow 18 is linear and generally parallel to the axis 16 or "trucking" motion. The term "trucking" is used herein to refer to the process of following a moving object to keep the image within the field of view of the camera, or moving parallel to a stationary scene in which the image is kept within the field of the camera. "Trucking" is distinguished from "panning" in which the camera is rotated about a vertical pivot such that the camera motion would be arcuate whereas the scene would be planar and the motion relative to the scene would be arcuate. The term "trucking" would, however, include a camera mounted to rotate on a vertical axis positioned within a scene which is cylindrical as the motion of the camera would be parallel to the scene.

Scene 12 and camera 14 can be of various types. Scene 12 can be outdoors or indoors as with any photography. Both objects relatively close or objects of great distance as when filming a group of race cars coming down the speedway toward the camera, or when filming the horizon of a rocky mountain range. In each case, the axis 16 is determined by the photographer determining the path of camera movement 18. On the other hand, when filming a 3-dimensional scene 12 on a 2-dimensional medium such as a canvas, the axis 16 is determined by the plane of the canvas and the camera path 18 is determined therefrom. Complex alterations of camera movement to maintain its general parallelism with axis 16 is also possible during the photographing of the scene. Camera 14 may be mounted on a dolly 20 movable along a track 22 as shown or mounted on a vehicle such as a car or truck or mounted on an airplane for movement relative the scene or in any other manner devisable.

Camera 14 can also be of various types. Camera 14 can be a conventional movie camera, a conventional still camera capable of multiple exposures, a conventional television camera or any other camera on which pictures may be recorded on film, tape or other media.

The film is then developed and separated into film chips, frames, or individual exposures. The term "frame" is used herein to refer to a single photograph in a motion picture, filmstrip, videotape or similar sequence of exposures. The term "exposure" is used herein to refer to multiple exposures shot with a motion picture camera, computer generated images or a video camera or the single exposure shot with a still camera by triggering the shutter of the camera. The term "film chip" or "chip" is used herein to refer to a small piece of film or video tape or similar sequence of exposures and includes one or more frames or individual exposures. Frames or exposures or chips may be computer altered to add or remove material or colorize as desired.

The term "motion picture" is used herein to refer to a sequence of exposures taken with a short (usually fixed) time interval between successive exposures. The term "picture" is used herein to refer to a still photograph, a completed motion picture or videotape, computer generated images or individual frames or exposures of a motion picture or videotape.

There are three types of images which at distances greater than the focal length of the lens system used may be described as stereographic: (1) normal stereographic images where the images are photographed at positions spaced apart the same distance as the pair of human eyes viewing the images; (2) hyper-stereographic images occur when the images are photographed at positions spaced apart a distance greater than the distance between the human eyes viewing the images which will result in an exaggerated third dimension of depth for the stereographic pair of images; (3) hypo-stereographic images occur when the images are photographed at positions spaced apart a distance less than the distance between the human eyes viewing the images which will result in a less than normal third dimension of depth in the stereographic pair of images being viewed.

Thus, when separating film chips into stereographic pairs of images, one can adjust for a hyper-stereographic or hypo-stereographic effect if desired. For example, if frames of a motion picture or a videotape are chosen to create normal stereographic pairs, then, if two frames are chosen closer together, a hypo-stereographic effect would occur. Similarly, frames or images can be chosen further apart on the film to either correct the hypo-stereographic effect into a normal stereographic effect or to create a hyper-stereographic effect.

Thus, once the camera starts to move relative to the nearest object of the film plane being photographed, each frame taken will create a stereographic pair, although the desired effect may not be achieved until several frames later. The achieved effect will depend on how fast the camera is moving relative to the scene, the distance between the camera and the nearest object to the film plane, and how fast the repetitive exposures are being taken. The stereo images result from the camera's movement relative to the scene.

The separating step forms stereo pairs of frames or chips for stereoscopic viewing. Stereoscopic viewing is accomplished by taking 2-dimensional images and viewing the images, one with the left eye and one with the right eye, independently, to create a third dimension of depth. Each of the images viewed is photographed from a slightly different position due to the relative movement between the camera and the scene. In one version of the improved method of the invention, a conventional motion picture camera, computer generated images or video camera 14 is mounted on a dolly 20 and moved along track 22 as indicated by arrow 18 relative to the scene 12 while photographing the scene 12 as shown in FIG. 1. The film, filmstrip or videotape or multiple exposures from a still camera are examined and chips of the film are separated into stereo pairs to result in the desired stereographic effect. For example, a normal stereo pair from a continuous filmstrip, movie film, or videotape may include the 1st chip (No. 1) and the 30th (No. 30) chip. While the 2nd chip away from the 1st chip photographed while the camera is moving relative to the scene would still make a stereo pair, the third dimension of depth would result in a hypo-stereo effect. The chips further away from the 1st chip than chip No. 30 would increase the depth of the stereographic pair, as the 2nd chip is chosen past the distance of the spacing of the human eyes, and result in a hyper-stereographic effect. The same technique would be utilized using a videotape except that the videotape would need to be paused and copies of the frames taken in order to make a stereographic pair.

Since most motion picture film produced runs on the average of 32 frames per second, and the average spacing between a human's eyes is approximately 2½ to 3 inches, camera movement at about 10 feet per second would position normal stereo pairs approximately every 12 frames.

Depending upon the viewing procedure, stereographic pairs can be produced in accordance with the method utilizing either print film (negative film) or slide film (positive film). Negative film stereographic pairs would create, for example, stereographic cards for viewing through stereoscopes. Stereographic pairs on negative film can also be viewed with a hand viewer or made into positive prints or positive replications. Slide film (positive film) can be viewed in hand held viewers or various other means such as the "VIEW MASTER" viewer.

In today's technical world of film processing, videotapes and film, positive or negative films, can be easily altered as desired. Film frames used can be altered to alleviate problems with movement, objects too close or back-ground scenes and still achieve the stereo effect desired. Computers now allow these alterations to be accomplished so as to add or delete objects or vary their relative positioning on the frame.

In addition to stereographic pairs of still photographs, stereographic pairs can be combined to produce stereographic motion pictures or videotapes. Stereographic motion pictures or videotapes can be made from 2-dimensional film or tape photographing 3-dimensional scenes by moving the camera 14 as illustrated in FIG. 1 relative to the scene. This would be achieved by utilizing stereo pairs from the film matched all the way through the motion picture film as the camera is being moved relative to the scene. Whether the camera is being moved by a walking person, a vehicle, an airplane, or any other form of motion, if the best stereo pairs were the 1st chip and 64th chip, the next stereo-graphic pair would be the 2nd chip and the 65th chip, and so on. This sequence would continue to the end of the filmstrip with the left eye side ending 63 frames before the right eye side and with some of the frames serving both the right and left sides in 2 dimensions. In the performance of the method if the speed of the camera 14 is varied, the optimum stereo pairs would be found either closer together or farther apart than 63 frames.

The improved method of the invention also may be used to produce stereographic pairs from previously taken or historic pictures. For example, photographs taken from a World War II aircraft flying over the remains of Berlin, Germany after a bombing run can be utilized to produce stereographic pairs having the third dimension of depth. The separation of the chips from such movie or multiple exposures of a still camera into stereographic pairs would occur similarly as above described.

Scientific documentaries would be greatly enhanced by the improved method of the invention. For example, in the discovery of the Titanic, a small submarine was used to find the remains of the Titanic and to make a motion picture of the wreckage. By scanning the remains while the motion picture was being made, stereo pairs can then be produced from the motion picture above described enhancing the understanding of the discovery.

As it may be unknown to the one performing the method of the invention as to the direction of movement of the camera relative to the scene with regard to historic pictures, some trial and error may be required to produce optimal stereographic pairs. If the chosen chips are, for example, chosen for the left and right eyes and camera movement was from right to left, rather than left to right, then the stereographic pair will result in a pseudo-stereoscopic effect. The term "pseudo-stereoscopic" is used herein to describe the phenomenon wherein the third dimension of depth is present, but the foreground appears to be closer to the viewer than the background, and, in other words, the foreground and background will appear reversed to the viewer. If this is experienced, stereo pairs may be made by selecting chips the same distance apart from a historic film or videotape in the opposite direction or in the opposite time sequence of multiple exposures of a still camera.

Similarly, in using films or videotapes where the backgrounds were paintings or photographs, for example, the "Wizard of Oz" and "Gone With The Wind," then the background and stage will appear in the stereo pair as if you were an actor or a director viewing the stage. 2-dimensional paintings or photographs utilized as the background will stay 2-dimensional and the actors relative to the background will have the third dimension of depth.

To achieve stereo pairs, it should be noted that the camera must move relative to the scene being photographed. However, that movement can be from side to side, up and down, or back and forth. All such movement will yield a stereo effect. However, in the separation step of the method, such must be sorted out by the film editor to produce stereo pairs which will produce the desired effect when viewed.

When using films or videotapes of the past and no records were kept as to how the film or tape was produced, then, certain assumptions must be made and the following formulas utilized. If, for example, the trucking movement of the camera relative to the scene was not perpendicular to the scene, the parallel distance of camera travel, "W," can be found utilizing the formula:

$$W = \cos\theta \times \text{distance moved (Hyp)}$$

where "θ" equals the apparent angle between the direction of trucking movement and the parallel direction, and the distance moved is the distance the camera was trucked. "W" equals the distance that the camera would have been trucked in a parallel direction in the same units the trucking movement was measured.

Similarly, while positioning the cameras one foot apart for photographing objects 30 feet away works well for 35 mm cameras, one must calculate this ratio for other film formats (widths) by the formula:

$$1:R = (50 \times 30)/N$$

where "N" is the normal size of the lens used for the format selected. Thus, one first needs to pick the camera to be used, the lens size and the width or format of the film prior to photographing stereographic pairs. "N" is then determined and inserted into the above formula, and the ratio 1:R is determined to determine the distance apart the cameras would have to be positioned relative to the objects being photographed and the relative distance the camera must be trucked between images to produce stereographic pairs in the film. The ratio 1:R is unit-less, and thus, if "1" were in meters, "R" would be in meters, and similarly, if "1" were in feet, "R" would be in feet.

The number of frames between stereo pairs may also be calculated using the formula:

$$B = (F \times T \times W)/S$$

where "B" equals frames between desired stereo pair, "F" equals frames per second, "T" equals the time in seconds of camera travel, "W" equals the distance needed for camera travel between desired stereo pairs, and "S" equals the distance the camera traveled. For example, if "F" equals 32 frames per second which is relatively conventional, and the time of camera travel were 20 seconds and the distance needed for camera travel is 10 feet whereas the camera traveled 100 feet, "B" or the frames between desired stereo pairs would equal 32 frames per second times 20 seconds times 10 feet divided by 100 feet, or 64 frames.

The distance needed for camera travel, "W," can be calculated by the following formula:

$$W=(D \times N)/(E \times L)$$

where "D" equals distance between the closest object and the film plane, "N" equals the size of the lens for the film width, or format selected for "normal" viewing, "E" equals the 3-D effect desired ("R" of 1:R), and "L" equals the focal length of lens used. For example, where the distance between the closest object and the film plane is 10 feet, and the normal lens for the format is 50 mm and the focal length of the lens used is 100 mm and the 3-D effect desired is 30 (30:1), "W" equals 16.67 feet.

"N" be calculated using the following formula:

$$N=\sqrt{(H^2+Q^2)}$$

where "N" is the size of the lens for the format used, "H" is the width of the film used, and "Q" is the length of the film frame, or the dimension of the chip used perpendicular to the width dimension.

The following examples will better explain the use of formulas to determine how the method is to be performed utilizing historic film or video-tapes.

EXAMPLE I

An airplane is traveling at 240 m.p.h. for a time of 30 seconds. The closest object to the film plane is a half mile away. The motion picture camera used, has a normal lens of 30 mm and the lens used has a 200 mm focal length. The motion picture camera is shooting 32 frames per second. The 1:40 rule is being used. The airplane is flying perpendicular to the subject being filmed.

| (1) Find "S": | | |
|---|---|---|
| S = 240 mi/hr × 5280 ft/mix 30 sec/3600 sec/hr | S = 38016000 ft/3600 | S = 10560 ft |
| (2) Find "W": | | |
| W = (D × N)/(E × L) | W = [(5280 ft × .5) × 30 mm]/(40 × 200 mm) | W = 79200 ft/8000 | W = 9.9 ft |
| (3) Find "B": | | |
| B = (F × T × W)/S | B = 32 frames/sec × 30 sec × 9.9 ft/10560 ft | B = 9504 frames/10560 ft | B = .9 or 1 frame |

This means every other frame will be a stereo pair. 960 frames were shot, so 480 stereo pairs from a 30 second filmstrip.

EXAMPLE II

An old film footage, a boat motoring up the Amazon River was shooting a motion picture camera of the villages along the river. The boat and camera were perpendicular to the river's edge while the film footage was being shot. The strip of film wanted to be processed into stereo pairs was 1,500 frames long and contained a village. The village appeared to be around 1,000 feet away from the camera and boat. 1:40 rule is desired and the normal lens for this format is a 30 mm. Camera usually runs 32 frames per second. The film footage covered is approximately 2,000 feet of shoreline.

| (1) Find "W": | | | |
|---|---|---|---|
| W = (D × N)/(E × L) | W = (1000 ft × 30 mm)/(40 × 30 mm) | W = 1000 ft/40 | W = 25 ft |
| (2) Find "B": | | | |
| B = (F × T × W)/S | B = 32 frames/sec × T × 25 ft/2000 ft | | |
| | T = 1500 frames/32 frames/sec | T = 1500/32 sec | T = 47 sec |
| B = 32 frames/sec × 47 sec × 25 ft/2000 ft | | B = 37600 frames/2000 | |
| | B = 18.8 Frames or 19 frames | | |

Thus, every 19th frame should be a stereo pair. "S" could also be figured by apparent land speed (what it looked like in the film). 39 stereo pairs are possible at the 1:40 rule. Frame No. 1 will be the left side frame and No. 39 will be the right side. Stereo pairs can start at any frame, for example, No. 110 then frame No. 148 would be the pair. If a stereo pair was wanted around frame No. 39 to frame No. 78, then frame No. 39 would be the left side.

EXAMPLE III

Figure 5:
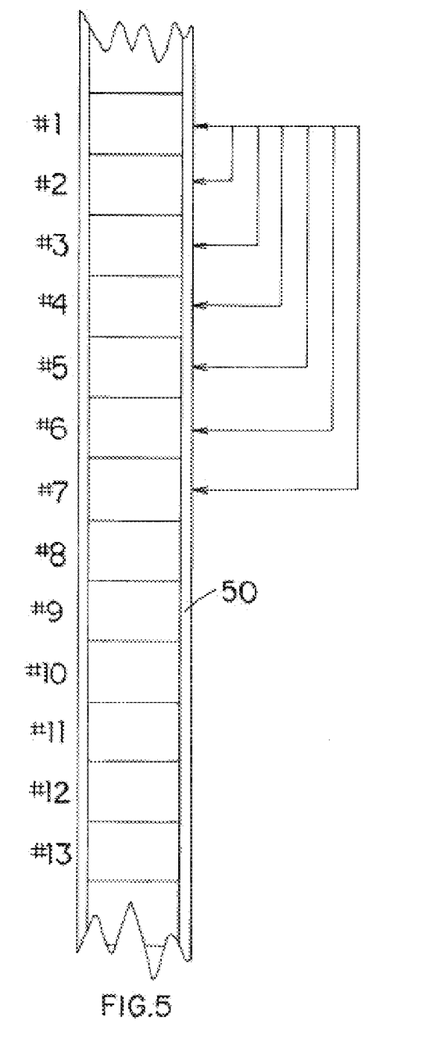
FIG. 5 is a fragmentary planar view of a film strip for use in further explaining the improved method of the invention in accordance with Example III.
Figure 6:
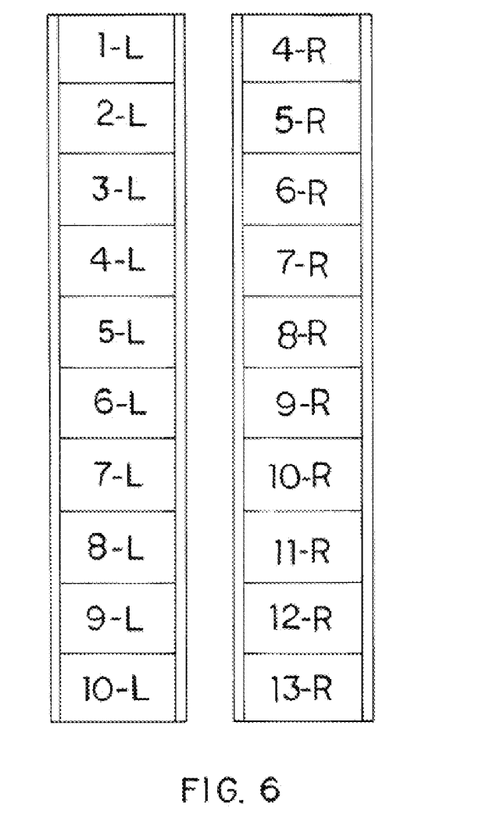
FIG. 6 is top planar view of two fabricated film strips from the single film strip illustrated in FIG. 5 used to explain the improved method of the invention in accordance with Example III.

In reference to FIG. 5 and FIG. 6, stereographic pairs may be produced from a 2-dimensional film strip illustrated in FIG. 5. Film strip 50 is trucked at a constant speed from left to right parallel to the scene. "B" equals 3 frames. The result desired is a normal stereo effect. Chip No. 1 is the first right side Chip No. 1-R. Chip No. 2 is the first left side chip although hypo-stereo No. 2-L and so on. Chip No. 1-R and Chip No. 3-L are still hypo-stereo pairs, but should show more depth in viewing than Chip No. 1-R and 2-L. Chip No. 1-R and 4-L are the desired pair, since "B" equals 3 frames. Any chip closer to this pair will be hypo-stereo and any chip farther apart than this pair will be hyper-stereo. Thus, Chip Nos. 1-R and 5-L are the first hyper-stereo pair. This pair will exaggerate the normal stereo effect. Chip Nos. 1-R and 6-L are also a hypo-stereo pair and will add more exaggeration to the normal pair than a stereo pair consisting of Chip Nos. 1-R and 5-L. In producing stereo pairs there is a point where too much separation may occur. This will occur when the eyes start to strain and cannot make sense of the stereo pair. There is no formula for this maximum distance between stereo pairs as it differs from person to person.

The film strip 50 illustrated in FIG. 5 results in six normal stereo pairs without duplication:

| | |
|---|---|
| 1 | No. 1-L and No. 4-R |
| 2 | No. 2-L and No. 5-R |
| 3 | No. 3-L and No. 6-R |
| 4 | No. 7-L and No. 10-R |
| 5 | No. 8-L and No. 1-R |
| 6 | No. 9-L and No. 12-R |

Other pairs can be obtained as long as "B" equals 3, for example:
1. No. 5-L and No. 8-R
2. No. 10-L and No. 13-R If duplications are made from the filmstrip 50, then 10 normal stereo pairs are possible as shown in FIG. 6.

Thus, it is possible to make a motion picture from stereo pairs using duplications. 3-D motion picture footage can be obtained showing both strips simultaneously. When the filmstrips are played at the same speed as they were filmed, the same results are obtained as the camera experienced when the filmstrips were being made.

EXAMPLE IV

Figure 7:
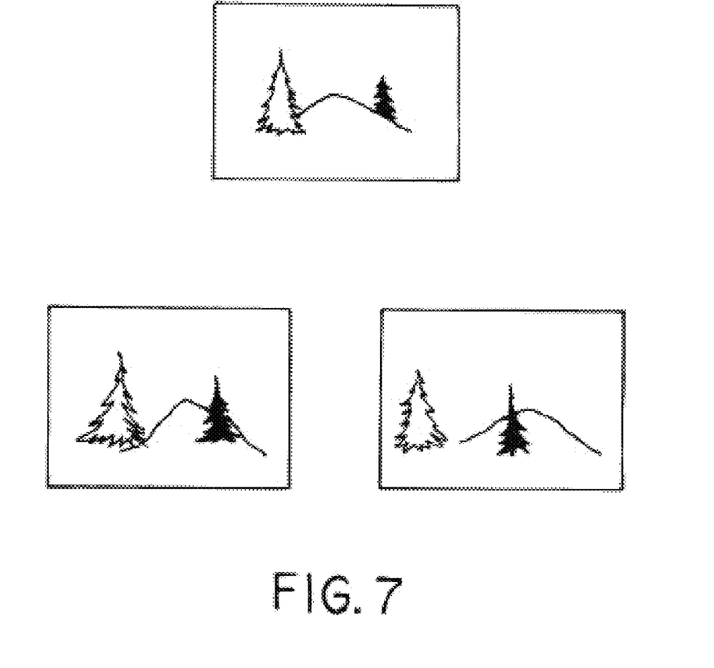
FIG. 7 is a grouping of three film clips illustrative of use of the new and improved method of the invention in conducting research more fully described in Example IV.

In conducting research, many times filmstrips are utilized. If a chip, such as shown in FIG. 7 is utilized, it is difficult to determine if the trees are short next to a small rock or are the large with a large rock, or a mountain in the background. Only in a filmstrip such as shown in FIG. 5 into stereo pairs can the correct image be determined. Chip No. 2-L shows the left side of the stereo pair. Film Chip No. 3-R shows the right side of the stereo pair. From these film chips, it is clear that the rock is a mountain in the background with smaller trees in the foreground.

EXAMPLE V

Figure 8:
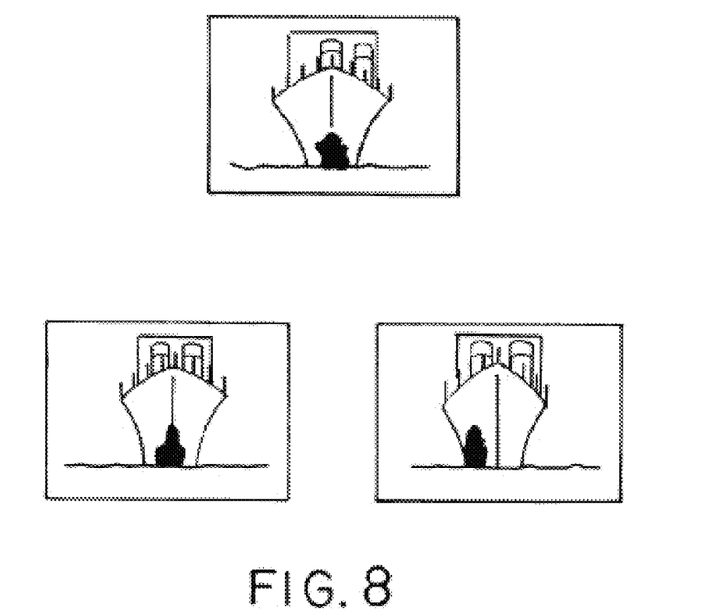
FIG. 8 is a grouping of three film clips illustrative of the use of the new and improved method of the invention in scientific endeavors as more fully described in Example V.

In scientific exploration, the new and improved method of the invention can be utilized effectively. FIG. 8 shows a single film chip of a sunken ship, with what appears to be a large hole in the bow of the ship. Photographing the sunken ship from a submarine utilizing the improved method of this invention to produce a filmstrip 50 such as shown in FIG. 5 can be utilized to more fully understand is being viewed. By separating stereo pairs from the filmstrip as above described, Chip No. 5-L and Chip No. 6-R as shown in FIG. 8, it is readily determined that what previously appeared to be a large hole in the bow of the ship is actually a rock about 30 feet in front of the sunken ship.

Figure 2:
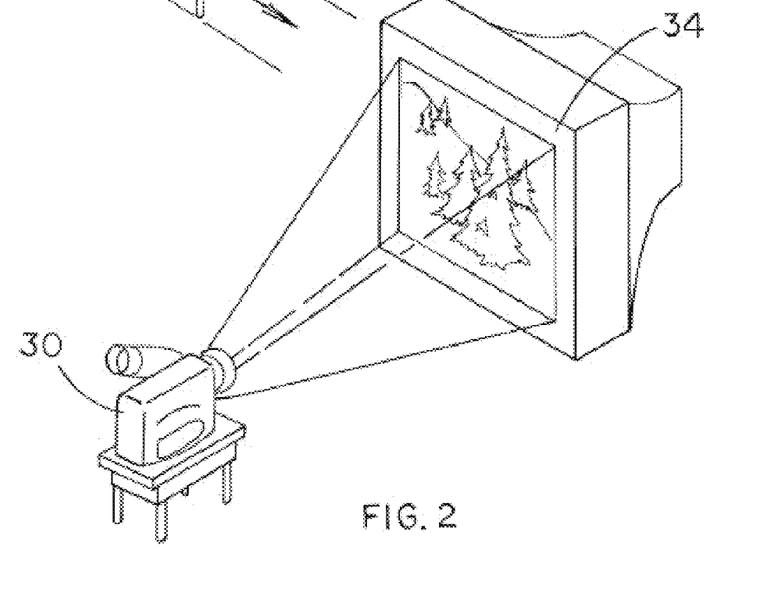
FIG. 2 is a view similar to FIG. 1 of the apparatus used in performing the method of the invention to produce stereoscopic pictures from a previously photographed motion picture film, computer generated images or video tape.

Referring to FIG. 2, stereographic pairs can also be produced from videotape or motion pictures with the camera being stationary as shown. Provided the motion picture or videotape has been previously made utilizing a camera moving relative to the scene and the process described with regard to FIG. 1, stereo pairs can be produced utilizing a camera 30 positioned on a stationary table 32 and aimed at a television set or monitor or any other viewing device or motion picture screen 34. Spaced apart frames or exposures are taken in accordance with the method of the invention and separated to produce film chips and matching those film chips into stereo pairs as above described. The time interval between the exposures that will formulate the ideal stereographic pairs can either be calculated in accordance with the formulas above utilized if the details of the filming of the motion picture or videotape are known or can be determined by trial and error in accordance with the above disclosure.

Figure 3:
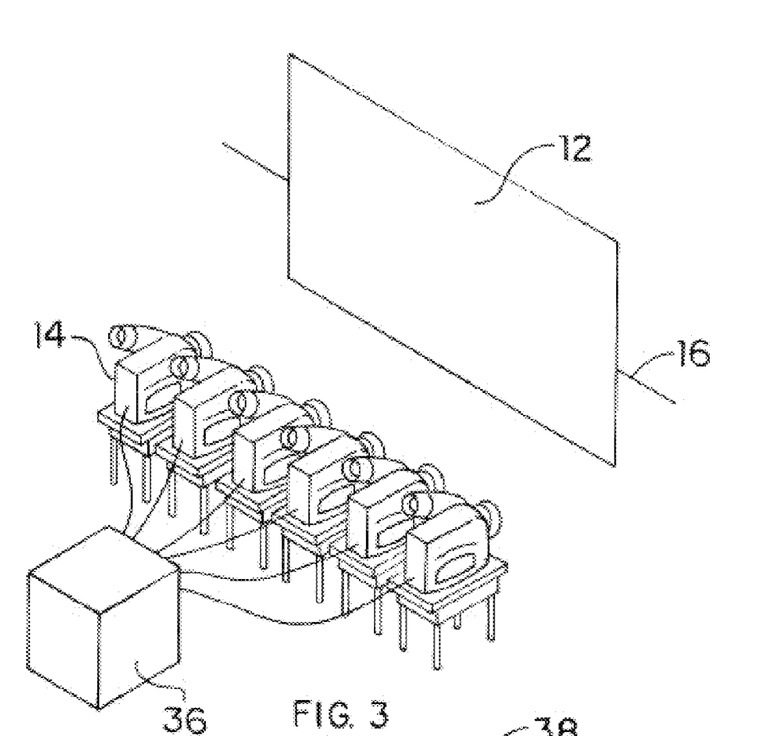
FIG. 3 is a diagram like FIG. 1 in which multiple cameras are used.

Referring to FIG. 3, another version of the method of the invention is illustrated utilizing a plurality of fixed cameras rather than a single moving camera. Each of these cameras 14 are fixed in position on a table 32 and connected to a sequencer 36. Sequencer 36 activates each of the cameras 14 in sequence, thereby simulating motion of the camera 14 as illustrated in FIG. 1. Otherwise, the method of the invention is as above described.

Figure 4:
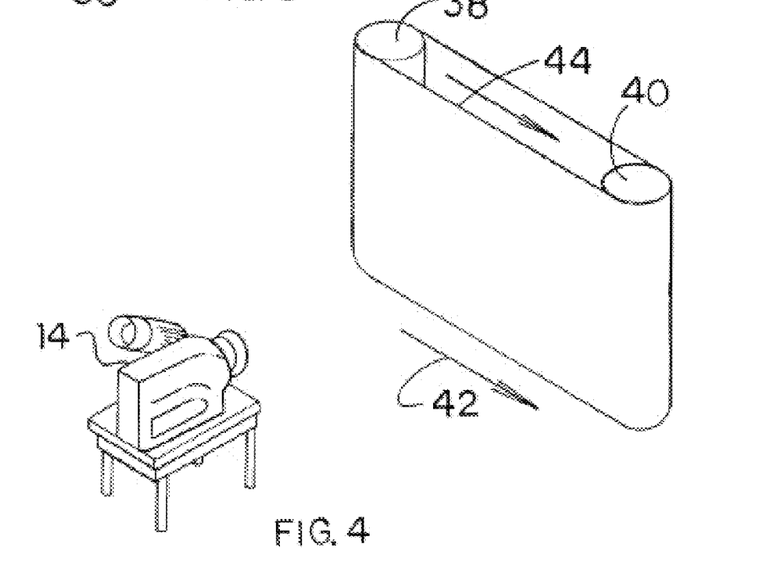
FIG. 4 is a view like FIG. 1 in which the camera is stationary.

Referring to FIG. 4, still another version of the apparatus to perform the method of the invention is illustrated. In this modification, camera 14 is again stationary, being supported upon a stationary table 32. The camera photographs a moving 3-D scene supported on a tape between rolls 38 and 40 and moved as indicated by the arrows 42. Again, the camera 14 is moved relative to the scene or tape 44 being photographed.

Various photographic effects can also be incorporated into the method of the invention. One such effect, as an example of the photographic effects which are well known to professional photographers, is the blurring effect utilized in both still and motion pictures to emphasize the speed of an object. When the camera is being moved relative to the scene at a relatively fast pace with an object relatively close to the film plane blurring, or streaking, will occur when the film speed is too slow to stop the action.

Blurring can be accomplished by the movement of the camera relative to the scene and by the object moving relative to the camera faster than film is able to stop the action. To determine the speed above which blurring will occur, the following formula can be utilized:

Exposure Time in seconds=(Distance×Distance Factor)/875×Speed×Lens Magnification In operation, each of the cameras are operated conventionally within the skill of the photographer. In the versions of the method of the invention illustrated in FIG. 1 and FIG. 4, the speed of the camera or the speed of the scene and the perpendicular orientation between the camera and the scene can be accurately determined as long as the speed of the film (the frames per second of a movie camera or the speed of the videotape of a television camera) and the speed of the relative motion between the camera and the scene does not vary, and it is possible to calculate out which of the frames should be matched to form the optimal stereographic pair. This would allow frames or film chips to be paired mechanically in an assembly line production. Assembly line production of stereo pairs can also be accomplished even when various photographic effects such as blurring are being utilized and certain scenes are being produced with hyper-stereographic or hypo-stereographic effects.

The performance of the method of this invention, however, becomes more difficult when the camera is moved relative to the scene by mounting the camera in an airplane or on a boat or otherwise in which the movement of the camera is not precise, varies speed, and the camera moves up and down and toward and away from the scene during the photographing process. In these cases, it may be only possible to achieve optimum stereographic pairs of film chips or frames by manually pairing the same. Camera motion toward and away from the film is only critical when the focal length of the camera lens is set at relatively short distances. Camera motion up and down relative to the scene can usually be accommodated by cropping the frames at the top and/or bottom and utilizing only the center portion thereof for stereo pairs. When no intentional blurring is involved, variations in the speed of the relative motion between the camera and the scene can be accomplished by merely varying the distance between stereo pairs similar to when intentionally choosing hypo-stereographic or hyper-stereographic pairs.

The improved method of the invention provides a relatively simple way of producing stereoscopic images utilizing conventional and inexpensive equipment and ordinary lighting all within the expertise of both professional and amateur photographers. The improved method of the invention allows for the method to be performed using still cameras, motion picture cameras, computer generated images, and video cameras, using ordinary lighting techniques and using film, tape, or any other medium. The improved method of the invention does not limit the artistic ability of the photographer and most all "effects" that photographers utilize to enhance film can also be utilized with the method of the invention. Particularly, blurring effects, hypo-stereo and hyper-stereo effects are all within the scope of the method of the invention.

Figure 9:
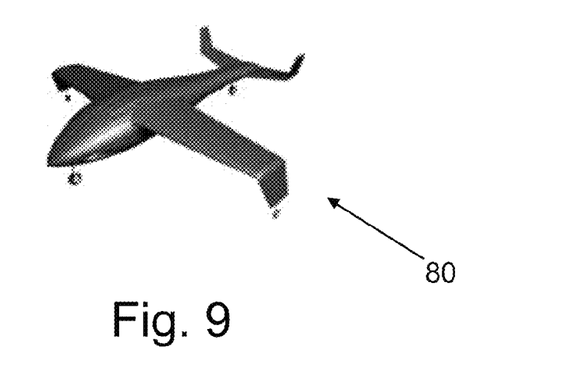
FIG. 9 is a sketch of a single drone for aerial photography.

FIG. 9 is a sketch of a single drone or equal 80 with a camera 40 or equal for aerial photography.

Figure 10:
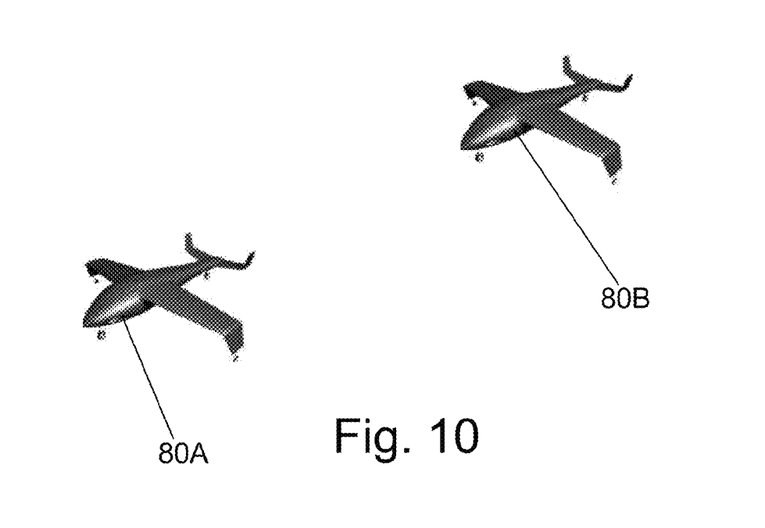
FIG. 10 is a sketch showing a drone on separate passes at different times over the same topography.

FIG. 10 is a sketch showing a drone or equal on separate passes 80A and 80B at different times over the same topography. Two different passes of the exact same scene at X time later, using one or more cameras. The carrying device could be planes, drones, anything that can truck a camera then compare by over lay, side by side looking for any differences, by eye or by computer comparing pixel by pixel if necessary.

Likewise and as an example and not a limitation, one or more cameras and imaging devices could be carried by a vehicle group consisting of drones, satellites, rockets, slings rocket, missile, high speed slinging devices and the like. The carrying device would truck the cameras past objects and again provide the film and image data for creating the relatively simple way of producing stereoscopic images.

Figure 11:
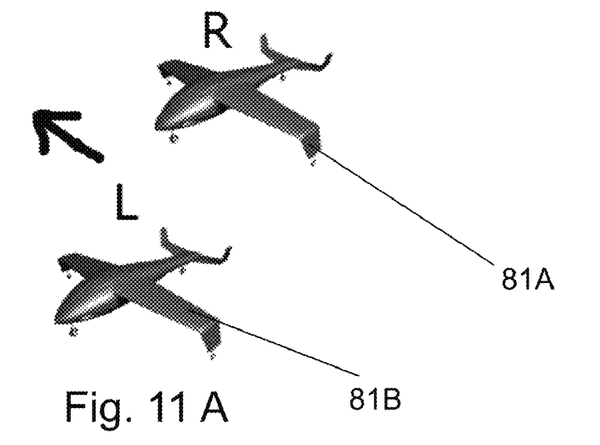
Figure 11C:
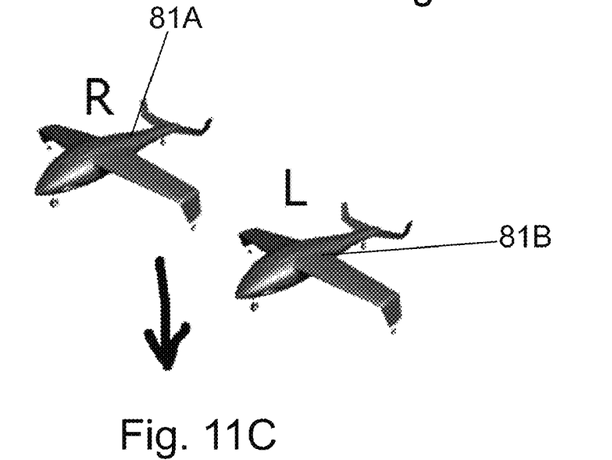

FIGS. 11A through 11 C are sketches of two drones in various positions with respect to each other. The motion of the two drones flying at angles with each other are shown as 45 degrees, but this is exemplary and not a limitation to the scope of the invention presented herein. FIG. 11 A demonstrates a First drone 81A looking 45 degrees to the right to a Second drone 81B. FIG. 11 B demonstrates a First drone 81A (R) looking 45 degrees to the left to a Second drone 81B (L). FIG. 11 A demonstrates a First drone 81A (R) Aligned and looking straight down for height to a Second drone 81B.

Figure 12:
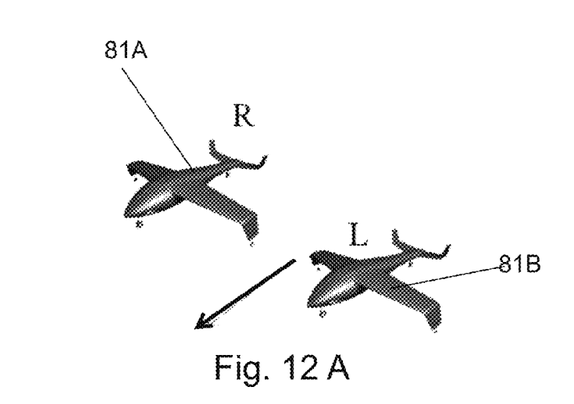

FIGS. 12A through 12 C are additional sketches of two drones in various positions with respect to each other. FIG. 12 A demonstrates a First drone 81A looking straight ahead and a Second drone 81B looking straight ahead while the drones 81A and 81B are flying side by side making simultaneous passes. FIG. 12 B demonstrates a First drone 81A looking straight Left and a Second drone 81B looking straight Left while the drones 81A and 81B are flying in direct line simultaneously and same altitude.

FIG. 12 C demonstrates a First drone 81A looking straight Right and a Second drone 81B looking straight Right while the drones 81A and 81B are flying in direct line and same altitude.

FIGS. 9, 10, 11 and 12 demonstrate individually and collectively a method of making stereographic pairs of film chips comprising photographing a scene with a single conventional camera, moving said camera in trucking motion relative to said scene a distance to W where:

$$W=(D \times N)/(E \times L)$$

where D equals the distance to the closest object of the film plane, N equals normal lenses for the format used, E equals the 3-dimensional effect desired as ("R" of 1:R) and L equals the length of the lens used, thereby producing a plurality of film chips at different positions relative to the scene, and separating said chips from each other into stereographic pairs for simultaneous viewing by a left and right eye, respectively, so as to produce a 3-dimensional viewing of said scene. whereby the trucking motion is by created moving the camera with at least one drone device and results in the three dimensional data.

Figure 13:
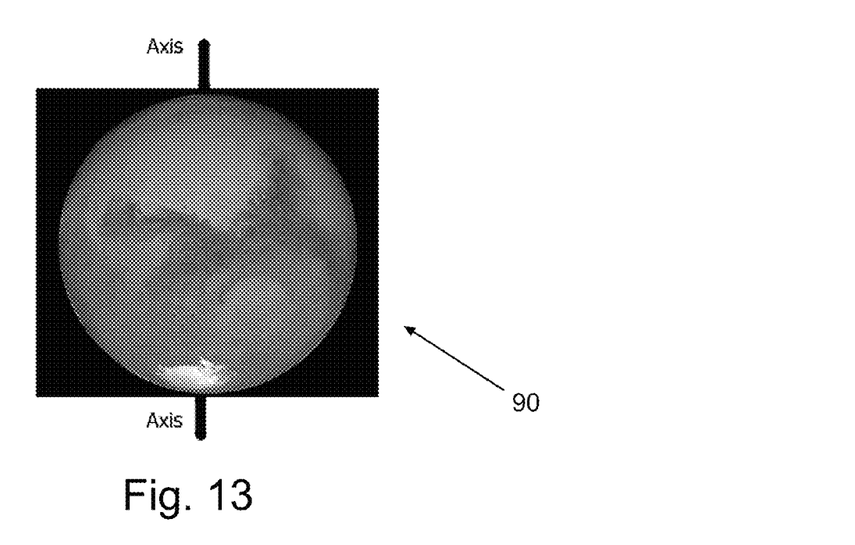
FIG. 13 is a sketch of a telescopic long range photograph of a planet or system in the galaxy.

FIG. 13 is a sketch of a telescopic long range photograph 90 of a planet or system in the galaxy. The terms long range indicate a range where the topography of the planet may not easily be distinguished by means of a telescope. This photo was taken from the Hubble Telescope. If Mars is spinning on its axis then the Hubble can stay stationary while the planet spins does the moving.

Figure 14:
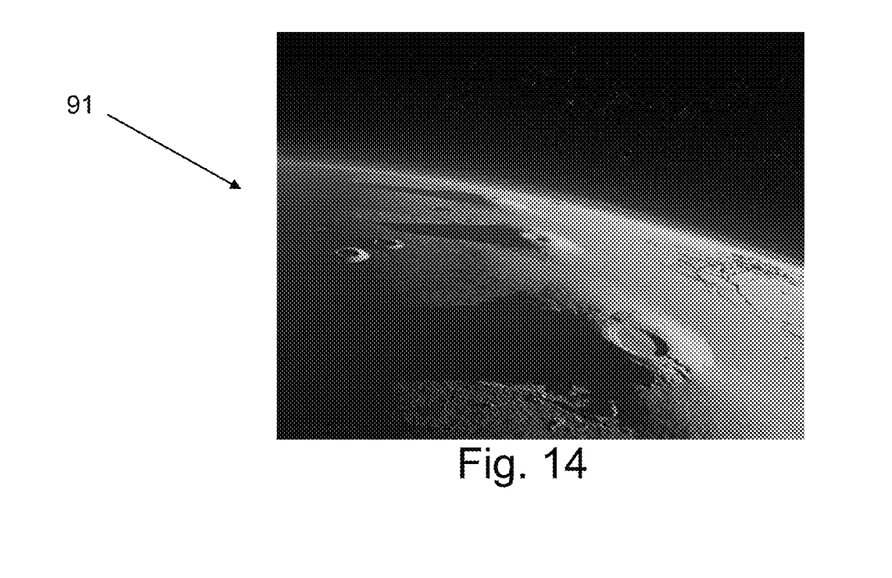
FIG. 14 is a sketch of a telescopic long range photograph of a specific planet and its respective topography.

FIG. 14 is a sketch of a telescopic closer range photograph 91 of a specific planet and its respective topography. The terms closer range indicate a range where the topography of the planet may be distinguished by means of a telescope. Satellites from space can take photos while orbiting around a planet it does not matter the 1:30 rules still applies. 1:30 mm, feet, miles, light years etc. The ratio still works. This allows 3 dimensional views from the ground of Mars and other planets.

Figure 15:
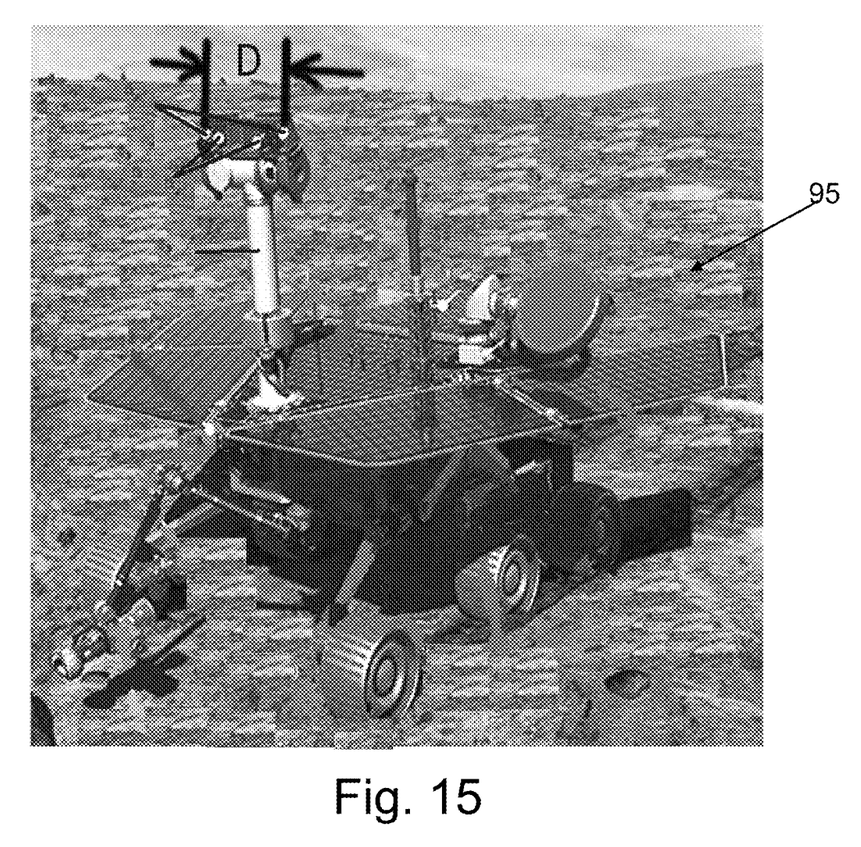
FIG. 15 is a sketch of a surface exploration vehicle in space exploration with various components.

FIG. 15 is a sketch of a surface exploration vehicle 95 in space exploration with various components. The distance marked "D" is the separation between the two lens for 3D capability. If the Rover was to take a photo then move perpendicular to the scene then Rover could go past the fixed distance of the mounted cameras and gain 3D depth further away.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto. With this description it is to be understood that the Stereo pair and method of making stereo pairs is not to be limited to only the disclosed embodiment of product and method. The features of the Stereo pair and method of making stereo pairs are intended to cover various modifications and equivalent arrangements included within the spirit and scope of the description.

What is claimed as new and desired to be protected by Letters Patent is:

1. A method of making stereographic pairs of film chips comprising photographing a scene with a single conventional camera, moving said camera in trucking motion relative to said scene a distance to W where:

$$W=(D \times N)/(E \times L)$$

where D equals the distance to the closest object of the film plane, N equals normal lenses for the format used, E equals the 3-dimensional effect desired as ("R" of 1:R) and L equals the length of the lens used, thereby producing a plurality of film chips at different positions relative to the scene, and separating said chips from each other into stereographic pairs for simultaneous viewing by a left and right eye, respectively, so as to produce a 3-dimensional viewing of said scene whereby the trucking motion is by created moving the camera with a motion of at least one vehicle device and results in the three dimensional data.

2. The method of claim 1 wherein the vehicle is at least one drone making the motion.

3. The method of claim 2 wherein the motion is of the one drone making two passes to create the stereo pairs.

4. The method of claim 2 wherein the motion is of two drones making simultaneous passes to create the stereo pairs.

5. The method of claim 4 wherein the motion is of the two drones flying side by side.

6. The method of claim 4 wherein the motion is of the two drones flying in a direct line with one drone ahead of the second drone.

7. The method of claim 4 wherein the motion of the two drones flying at angles with each other.

8. The method of claim 1 wherein the vehicle is at least one satellite and telescope making the motion from a long range.

9. The method of claim 1 wherein the vehicle is at least one satellite and telescope making the motion from a closer range.

10. The method of claim 1 wherein the vehicle is a surface exploration vehicle.

11. The method of claim 1 wherein the vehicle is at least one satellite and telescope making the motion from a closer range.

12. The method of claim 1 wherein the vehicle is a vehicle selected from the group consisting of drones, satellites, rockets, slings, missiles, and high speed slinging devices.

* * * * *